Figures 1, 2:
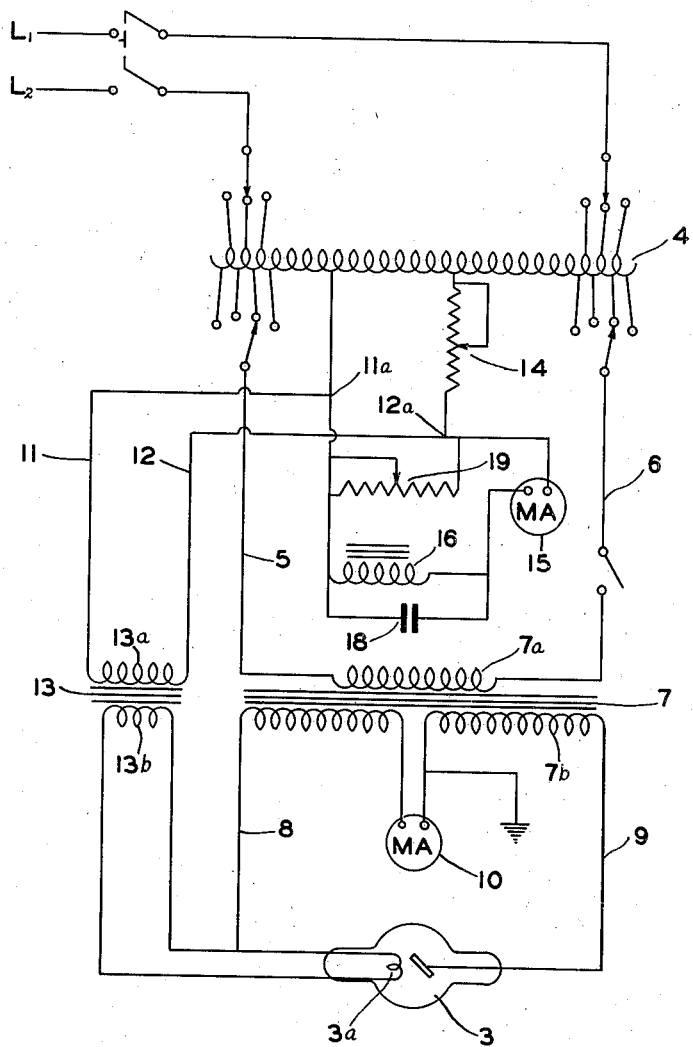

Sept. 12, 1939.        C. B. HORSLEY        2,172,581
X-RAY FILAMENT CURRENT METERING CIRCUIT
Filed Oct. 17, 1938

INVENTOR
CAPERTON B. HORSLEY
BY
Hyde, Higley & Meyer
ATTORNEYS

Patented Sept. 12, 1939

2,172,581

UNITED STATES PATENT OFFICE 2,172,581

X-RAY FILAMENT CURRENT METERING CIRCUIT

Caperton B. Horsley, Toronto, Ontario, Canada, assignor to Picker X-Ray Corporation Waite Manufacturing Division, Inc., Cleveland, Ohio, a corporation of Ohio Application October 17, 1938, Serial No. 235,341

4 Claims. (Cl. 250—103)

This invention relates to an improvement in means for metering the current supplied to the filament of an X-ray tube.

One of the objects of the present invention is to provide means for quickly and accurately setting the controls of an X-ray device so as to obtain the desired flow of filament current in the X-ray tube. As is well known, the determination of the output of an X-ray tube may be measured in the center ground circuit of the secondary of the transformer supplying power to the tube by means of a voltmeter or milliammeter but to make such a reading accurately requires at least one second so that much valuable life of the tube is lost when, for instance, it is desired to take a radiograph of one one-hundredth of a second exposure. There is therefore a great saving in the life of the tube if the output of the tube may be quickly and accurately set. My invention provides measuring means connected across the primary leads of the filament transformer whereby slight changes of voltage impressed across the filament transformer primary leads are magnified so as to be quickly and accurately read on the meter. My invention consists in the arrangements disclosed in the accompanying drawing and specification and the essential features thereof will be set forth in the claims.

In the drawing Fig. 1 is an electrical diagram illustrating one embodiment of my invention; while Fig. 2 is a representation of a characteristic curve of the inductor used in connection with my device.

I have illustrated my invention in connection with a standard X-ray tube 3 having a filament 3a. Power is supplied to the tube from the source L₁, L₂ through autotransformer 4 having leads 5 and 6 connecting it with the primary 7a of the transformer 7 whose secondary 7b is connected by leads 8 and 9 with the anode and cathode of the tube 3. A milliammeter is indicated at 10 connected in the center ground circuit of the transformer secondary for measuring the output of the tube 3. This is a simple circuit using only half-wave rectification but it will be understood by those skilled in the art that this is for illustrative purposes only and that my device is applicable to any type circuit. Current may be supplied to the tube filament 3a in any suitable manner, that shown herein comprising leads 11 and 12 tapped into the autotransformer and supplying the primary 13a of the filament transformer 13 whose secondary 13b is connected to the filament 3a. Means is provided for controlling the current supplied to the filament transformer primary 13a as indicated at 14. The means here shown is an adjustable resistance but it will be understood that an adjustable inductance or other control means is within the scope of my invention.

As pointed out above too much time is consumed in adjusting the output of the tube 3 by reading the milliammeter 10. Another method of controlling the tube output is to connect the voltmeter across the leads 11 and 12 and by the adjusting means 14 setting such a voltmeter to a predetermined reading corresponding to the desired filament current. This method of operation is also unsatisfactory partly because it involves consulting a chart and the time consuming regulation of the device 14 to get a certain desired reading on the voltmeter. This is also disadvantageous because it is very difficult to get an accurate reading on a voltmeter between the leads 11 and 12 sufficiently close to obtain the desired control of the current at filament 3a because a very slight change in the voltage impressed across the leads 11 and 12 results in a wide variation of the current supplied to filament 3a.

My invention comprises the connection of a milliammeter 15 across the leads 11 and 12 and connected thereto in the diagram at 11a and 12a respectively. To magnify or spread out the readings on the meter 15 I provide in series therewith an inductor 16 preferably provided with a core. The characteristic curve of such an inductor is substantially as shown in Fig. 2. I so arrange my metering circuit that this inductor is loaded substantially to its saturation point. In other words under working conditions the inductor is acting under the conditions shown to the right of the point 17a on its characteristic curve 17. Under these operating conditions a slight change in the voltage passing through inductor 16 causes a wide variation in the current passing through it, which current is measured at the milliammeter 15. Thus as the adjustable resistance 14 varies the voltage impressed between the leads 11 and 12 slight variations in that voltage will result in magnified readings on the milliammeter 15. Thus the current supplied to the filament transformer primary 13a is quickly and accurately set so as to supply the desired current to the filament 3a. If desired and for easy control of the X-ray apparatus the milliammeter 15 may be calibrated in terms of the current supplied to the filament 3a.

A refinement of my device is illustrated in

Fig. 1 wherein a capacitor 18 is connected in parallel with the inductor 16 giving a resonant circuit. Such a circuit makes possible a more uniform and accurate series of readings over the range of the device.

Because of slight variations occurring in the manufacture of my equipment it is desirable to supply means for selecting the most sensitive operating conditions for the resonant circuit 16, 18. To this end I have supplied in parallel with the resonant circuit and the meter 15 an adjustable resistance 19. By means of this adjustable resistance the proper operating conditions as illustrated by the characteristic curve 17 may be selected.

What I claim is:

1. In X-ray apparatus having a tube filament supplied with current through a filament transformer and having means for varying the voltage impressed on the primary of said transformer, means for measuring a characteristic of the current flowing in said transformer primary comprising a milliammeter connected across the leads to said transformer primary, and an inductor in series with said meter electrically loaded substantially to its saturation point where a small change in voltage passing through it causes a large change in current passing through it.

2. In X-ray apparatus having a tube filament supplied with current through a filament transformer and having means for varying the voltage impressed on the primary of said transformer, means for measuring a characteristic of the current flowing in said transformer primary comprising a milliammeter connected across the leads to said transformer primary, an inductor in series with said meter, and a capacitor in parallel with said inductor to form a resonant circuit, whereby said meter makes a comparatively large current indication for a comparatively small change in the voltage impressed on said meter.

3. The combination of claim 2 together with means for varying the current flowing in said resonant circuit whereby to select that operating condition for said resonant circuit and meter at which the meter is most sensitive to small changes in voltage impressed on the primary of said transformer.

4. In X-ray apparatus having a tube filament supplied with current through a filament transformer and having means for varying the voltage impressed on the primary of said transformer, means for measuring a characteristic of the current flowing in said transformer primary comprising a milliammeter connected across the leads to said transformer primary, an inductor in series with said meter, a capacitor in parallel with said inductor to form a resonant circuit, whereby said meter makes a comparatively large current indication for a comparatively small change in the voltage impressed on said meter, and a variable resistance in parallel with said resonant circuit and said meter for selecting the most sensitive operating condition for said resonant circuit.

CAPERTON B. HORSLEY.